United States Patent
Bock

(10) Patent No.: US 9,307,172 B2
(45) Date of Patent: Apr. 5, 2016

(54) FLOATING POINT IMAGE SENSORS WITH TILE-BASED MEMORY

(71) Applicant: Semiconductor Components Industries, LLC, Phoenix, AZ (US)

(72) Inventor: Nikolai Bock, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 15 days.

(21) Appl. No.: 14/459,068

(22) Filed: Aug. 13, 2014

(65) Prior Publication Data

US 2015/0055001 A1    Feb. 26, 2015

Related U.S. Application Data

(60) Provisional application No. 61/869,579, filed on Aug. 23, 2013.

(51) Int. Cl.
*H04N 5/3745* (2011.01)
*H04N 5/378* (2011.01)
*H04N 5/355* (2011.01)

(52) U.S. Cl.
CPC ............ *H04N 5/3745* (2013.01); *H04N 5/378* (2013.01); *H04N 5/37452* (2013.01); *H04N 5/37455* (2013.01); *H04N 5/37457* (2013.01); *H04N 5/355* (2013.01)

(58) Field of Classification Search
None
See application file for complete search history.

(56) References Cited

U.S. PATENT DOCUMENTS

| | | | | |
|---|---|---|---|---|
| 6,369,737 | B1 * | 4/2002 | Yang ..................... | H03M 1/38 341/155 |
| 2008/0192132 | A1 * | 8/2008 | Bechtel ................. | H04N 5/378 348/294 |
| 2009/0027533 | A1 * | 1/2009 | Itakura .................. | H04N 5/235 348/308 |
| 2009/0046181 | A1 * | 2/2009 | Olsen .................. | H04N 5/37455 348/265 |
| 2009/0160987 | A1 * | 6/2009 | Bechtel .................. | H04N 5/353 348/302 |
| 2009/0190015 | A1 * | 7/2009 | Bechtel ................ | H04N 5/2355 348/302 |
| 2011/0285887 | A1 * | 11/2011 | Takenaka ............... | H04N 5/374 348/300 |
| 2014/0091201 | A1 * | 4/2014 | Zhang ..................... | H03M 1/00 250/208.1 |

(Continued)

OTHER PUBLICATIONS

Bock et al., "A Wide—VGA CMOS Image Sensor with Global Shutter and Extended Dynamic Range" Micron Imaging, Mocton Technology Inc., Pasadena, CA., pp. 222-225, <URL: http://www.imagesensors.org/Past%20Workshops/2005%20Workshop/2005%20Papers/56%20Bock%20et%20al.pdf>.

(Continued)

*Primary Examiner* — Justin P Misleh
(74) *Attorney, Agent, or Firm* — Treyz Law Group, P.C.; Jason Tsai; Joseph F. Guihan

(57) ABSTRACT

An image sensor may include an array of image sensor pixels arranged in rows and columns. Each image pixel arranged along a given column may be coupled to analog-to-digital converter (ADC) circuitry that is capable of converting analog pixel signals into a digital floating point equivalent representation. The ADC circuitry may be configured to obtain an illumination value during an auto exposure period. The illumination value, which serves as an exponent value, can be stored as tile data in a tile column memory circuit. During actual readout, the ADC circuitry may be configured to perform mantissa conversion. During mantissa conversion, the ADC circuitry may use a reference voltage value that is adjusted based on the tile data. A mantissa value that is obtained during the mantissa conversion may then be combined with the exponent value for that tile to yield a final floating number point for that image pixel.

12 Claims, 8 Drawing Sheets

(56) References Cited

U.S. PATENT DOCUMENTS

2015/0054999 A1* 2/2015 Bock .................. H04N 5/378
 348/308
2015/0055000 A1* 2/2015 Bock .................. H04N 5/37452
 348/308

OTHER PUBLICATIONS

Huang et al., "Design of a PCT-Inspired Segmented ADC for High-Speed Column-Parallel CMOS Image Sensor", Forza Silicon Corporation, Pasadena, CA., 4 pages. <URL: http://www.imagesensors.org/Past%20Workshops/2011%20Workshop/2011%20Papers/R58_Huang_SegmentedADC.pdf>.

Lee et al., "A 10b Column-wise Two-step Single-slope ADC for High-speed CMOS Image Sensor" Yonsei University, Seoul, Korea, pp. 196-199 <URL: http://www.imagesensors.org/Past%20Workshops/2007%20Workshop/2007%20Papers/050%20Lee%20et%20al.pdf>.

Gonzalez et al., "Diginal Image Processing" Second Edition, 2002, 190 pages, Prentice-Hall, Inc., Upper Saddle River, New Jersey.

Bock et al., U.S. Appl. No. 14/455,752, filed Aug. 8, 2014.

\* cited by examiner

FLOATING POINT IMAGE SENSORS WITH TILE-BASED MEMORY

This application claims the benefit of provisional patent application No. 61/869,579, filed Aug. 23, 2013, which is hereby incorporated by reference herein in its entirety.

BACKGROUND

This relates generally to imaging devices, and more particularly, to CMOS image sensors.

Modern electronic devices such cellular telephones, cameras, and computers often use digital image sensors. Imagers (i.e., image sensors) may be formed from a two-dimensional array of image sensing pixels. Each pixel may include a photosensor such as a photodiode that receives incident photons (light) and converts the photons into electrical signals. Image sensors are sometimes designed to provide images to electronic devices using a Joint Photographic Experts Group (JPEG) format or any other suitable image format.

As image sensor pixels become smaller in size and as image resolution increases, image sensor data rates continue to increase as a result. To meet performance requirements at high data rates, a column parallel architecture in which each pixel column is coupled to a respective analog-to-digital converter (ADC) has been developed. Typically, each column ADC is required to exhibit high resolution such as 12-bit resolution. High dynamic range (HDR) image sensors may require even more ADC resolution. Such types of high resolution ADCs can consume a significant amount of power, occupy a large percentage of die area, and require long conversion times.

It would therefore be desirable to be able to provide improved imaging devices for capturing high resolution images.

DETAILED DESCRIPTION

Imaging systems having digital camera modules are widely used in electronic devices such as digital cameras, computers, cellular telephones, medical devices, and other electronic devices. A digital camera module may include one or more image sensors that gather incoming light to capture an image.

Figure 1:
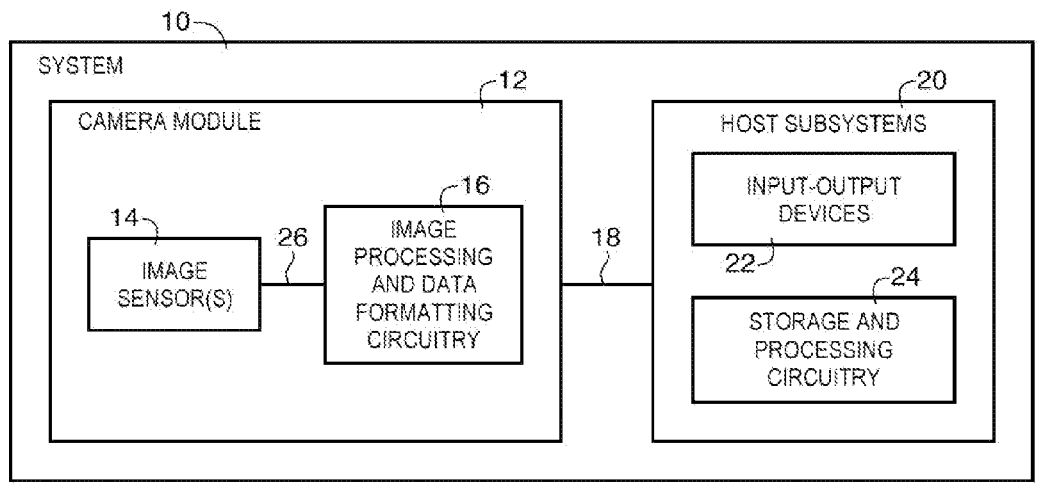
FIG. 1 is a schematic diagram of an illustrative imaging system with a camera sensor in accordance with an embodiment of the present invention.

FIG. 1 is a diagram of an illustrative imaging system that uses an image sensor to capture images. System 10 of FIG. 1 may be a vehicle safety system (e.g., an active braking system or other vehicle safety system), may be a surveillance system, or may be an electronic device such as a camera, a cellular telephone, a video camera, or other electronic device that captures digital image data. System 10 may include camera module 12 having one or more image sensors 14. Image sensor 14 may have one or more associated lenses for focusing light onto image sensor 14. Image sensor 14 may include photosensitive elements (e.g., image sensor pixels) that convert the light into digital data.

In general, image sensor 14 may have any number of pixels (e.g., hundreds, thousands, millions, or more pixels). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, and other suitable control circuitry for interfacing with the image sensor pixels.

Still and video image data from camera sensor 14 may be provided to image processing and data formatting circuitry 16 via path 26. Image processing and data formatting circuitry 16 may be used to perform image processing functions such as three-dimensional depth sensing, data formatting, adjusting white balance and exposure, implementing video image stabilization, face detection, etc. Image processing and data formatting circuitry 16 may also be used to compress raw camera image files, if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common integrated circuit. The use of a single integrated circuit to implement camera sensor 14 and image processing and data formatting circuitry 16 can help to reduce costs.

Camera module 12 may convey acquired image data to host subsystems 20 over path 18 (e.g., image processing and data formatting circuitry 16 may convey image data to subsystems 20). System 10 may provide a user with numerous high-level functions. In a computer or advanced cellular telephone, for example, a user may be provided with the ability to run user applications. To implement these functions, host subsystem 20 of system 10 may include storage and processing circuitry 24 and input-output devices 22 such as keypads, input-output ports, joysticks, and displays. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, or other processing circuits.

Figure 2:
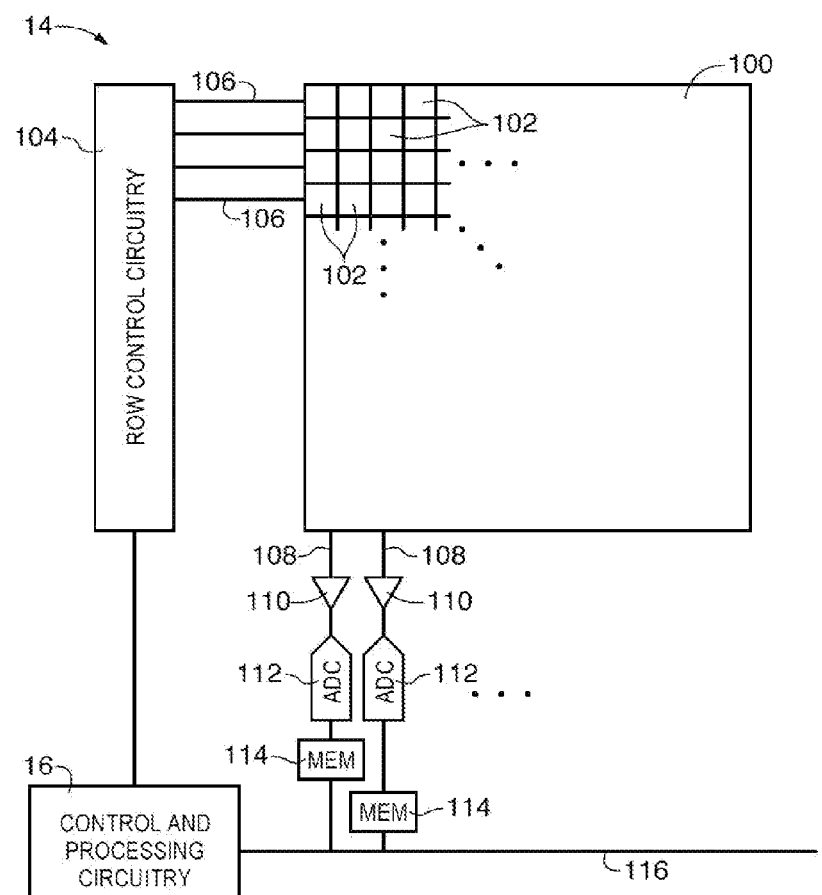
FIG. 2 is a diagram of an illustrative image sensor with an array of image sensor pixels in accordance with an embodiment of the present invention.

An illustrative arrangement for camera module 12 is shown in FIG. 2. As shown in FIG. 2, camera module 12 may include image sensor 14 and control and processing circuitry 16. Image sensor 14 may include a pixel array such as array 100 of image sensor pixels 102. Control circuitry 16 may be coupled to row control circuitry 104 and global data path 116. Row control circuitry 104 may receive row addresses from control circuitry 16 and may supply corresponding row control signals to image pixels 102 over control paths 106. For example, row control circuitry 104 may generate reset signals on reset lines in paths 106, charge transfer control signals on charge transfer control lines in paths 106, and row select (e.g., row readout) signals on row select lines in paths 106 to control the operation of pixels in array 100. If desired, row control circuitry 104 and array 100 may be integrated together in a single integrated circuit (as an example).

One or more conductive lines such as column lines 108 may be coupled to each column of image pixels 102 in image pixel array 100. Column lines 108 may be used for reading out image signals from image pixels 102 and for supplying bias signals (e.g., bias currents or bias voltages) to image pixels 102. During image pixel readout operations, a pixel row in image pixel array 100 may be selected using row control circuitry 104 and image data associated with image pixels 102 of that pixel row may be read out on column lines 108.

Each column line 108 may be coupled to column circuitry such as column amplifier 110, analog-to-digital converter (ADC) circuit 112, and column memory circuit 114. ADC circuit 112 may be used to convert analog signals on column lines 108 into corresponding digital signals before outputting to a corresponding memory circuit 114.

Array 100 may have any number of rows and columns. In general, the size of array 100 and the number of rows and columns in the array will depend on the particular implementation of image sensor 14. While rows and columns are generally described herein as being "horizontal" and "vertical," respectively, rows and columns may refer to any grid-like structure (e.g., features described herein as rows may be arranged vertically and features described herein as columns may be arranged horizontally).

The arrangement of FIG. 2 in which each pixel column line 108 is coupled to a corresponding ADC is sometimes referred to as a parallel column architecture. Conventionally, the ADC in each column is configured to exhibit high resolution. As an example, the ADC in each column may exhibit 12-bit resolution. Such types of high resolution ADCs can, however, consume a significant amount of power, occupy a large percentage of die area, and require long conversion times.

One way of addressing these drawbacks is to reduce the ADC resolution without having to compromise on dynamic range. In order to accomplish this, it may be helpful to understand the components of an image. In general, an image is formed by two factors: (1) the two-dimensional illumination of the scene multiplied by (2) the two-dimensional pattern of reflectance in a scene. Typically, most of the information in the mage is contained in the reflectance, which has about 30 dB dynamic range (e.g., which requires only a 5-bit depth). For comparison, the human eye can discriminate about 60 gray levels, which is equivalent to a 6-bit depth. Typical display components have 256 gray levels, which is equivalent to an 8-bit depth.

As described above, a two-dimensional image may be a function of (1) the amount of source illumination incident on a scene and (2) the amount of illumination reflected by objects in the scene, as shown in the following expression:

$$f(x,y)=i(x,y)*r(x,y) \quad (1)$$

where illumination $i(x,y)$ has a value between zero and positive infinity, and where reflectance $r(x,y)$ has a value between zero and one. In practice, the illumination has a brightness range of about 170 dB, whereas the reflectance has a brightness range of only about 30 dB. Combining these two components, an image can have up to 200 dB of dynamic range. To cover 200 dB of dynamic, at least a 32-bit depth is required.

However, taking in account that most of the image information is contained in the reflectance $r(x,y)$, a floating point representation of the image signal is proposed:

$$f=r*2^i \quad (2)$$

where mantissa r represents the reflectance and exponent i represents signal range determined by scene illumination. Assuming that reflectance r has a 6-bit depth, the floating point representation only requires a total of 11 bits instead of 32 bits to resolve 200 dB of brightness range. In this example, the exponent i has a 5-bit depth.

Figures 3, 4:
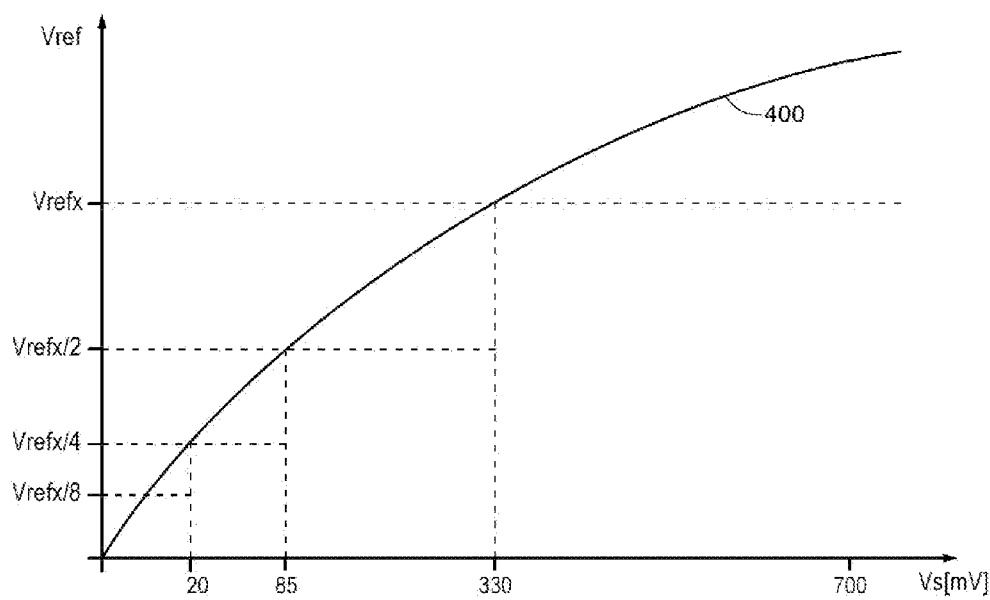
FIG. 3 is a diagram showing the amount of photon noise that is present at different ADC signal levels in accordance with an embodiment of the present invention.
FIG. 4 is a plot of reference voltage level versus pixel signal level showing different reference voltage ranges for achieving satisfactory signal-to-noise ratio (SNR) in accordance with an embodiment of the present invention.

Using this floating point representation, the first term r may be proportional to the image signal $V_S$ when exponent i is equal to zero, whereas the second term $2^i$ may be proportional to the ratio of integration time $T_{int}$ to an ADC reference voltage level Vref. To support the base-2 exponent term, integration time $T_{int}$ and ADC reference voltage level Vref should be incremented in multiples of 2 (e.g., the total light range has to be expressed in powers of 2). The digitized photo signal $V_S$ can therefore be expressed as follows:

$$V_S = \frac{I_{ph}}{q} C_G K_{SF} 2^N \frac{T_{int}}{V_{ref}} \quad (3)$$

where $I_{ph}$ is the photocurrent, q is the electron charge constant, $C_G$ is equal to the pixel conversion gain, $K_{SF}$ is the pixel source follower gain, N is the ADC bit depth, $T_{int}$ is the integration time and Vref is the ADC reference voltage level. Since $T_{int}$ and Vref should be in power of 2 increments, they can be expressed as follows:

$$T_{int}=2^n T_{int0} \quad (4)$$

$$V_{ref}=2^m V_{ref0} \quad (5)$$

where $T_{int0}$ represents the minimum integration time, and where Vref0 represents the minimum ADC reference voltage level. Substituting expressions 4 and 5 back into equation 3, equation 3 can then be rewritten as follows:

$$V_S = \left[ C_G K_{SF} 2^N \frac{T_{int0}}{qV_{ref0}} \right] I_{ph} 2^{n-m} \quad (6)$$

where n depends on the integration time and where m depends on the ADC reference voltage. To determine the necessary bit depth of the mantissa, the amount of photon noise may be considered. Photon noise $V_{ph}$ may be defined as the square root of the mean number of photons in some time interval of interest (as an example). FIG. 3 illustrates LSB (least significant bit) bits that are affected by photon noise (see, shaded LSB bits 300 in FIG. 3) for a 13-bit A/D converter at different signal levels. As shown in FIG. 3, noiseless MSB (most significant bit) bit depth 302 never exceeds 6 bits (e.g., only six MSB bits D7-D12 are noiseless at the "4096" signal level;

only five MSB bits D6-D10 are noiseless at the "1024" signal level; only four MSB bits D5-D8 are noiseless at the "256" signal level; only three MSB bits D4-D6 are noiseless at the "64" signal level; etc.). In other words, a 6-bit ADC may be enough to resolve all meaningful (i.e., noiseless) information from a scene instead of the full 13-bit implementation.

An additional parameter that should be accounted for is quantization noise $V_{qn}$, which may be defined as the ratio of $V_{LSB}$ to the square-root of 12 (as an example), where $V_{LSB}$ is equal to $Vref/2^N$. Since $V_{qn}$ is inversely proportional to ADC bit depth N, a lower resolution ADC will yield higher levels of quantization noise. Quantization noise may therefore be relevant because at low light levels, a 6-bit ADC quantization noise can actually limit the signal-to-noise ratio (SNR).

To circumvent this limitation, the ADC reference voltage level may be adapted according to the illumination level, which determines the photon noise $V_{ph}$. Assuming the sensor signal-to-noise ratio $SNR_S$ has to follow the photon-noise-limited signal-to-noise ratio $SNR_{ph}$ with some delta δ, the following equation can be written:

$$20\log\left(\frac{V_S}{V_{ph}}\right) - 20\log\left(\frac{V_S}{\sqrt{V_{ph}^2 + V_{qn}^2}}\right) = \delta \quad (7)$$

Substituting the expression of $V_{qn}$, which is a function of Vref and N as described above (e.g., $V_{qn}=Vref/(2_N\sqrt{12})$), and the expression of $V_S$ in equation 6 into equation 7, assuming photon noise is equal to $\sqrt{(V_S K_{SF} C_G)}$, and then solving for Vref would then yield:

$$V_{ref}=2^N\sqrt{12(10^{\delta/10}-1)V_S K_{SF} C_G} \quad (8)$$

FIG. 4 shows a curve 400 that plots ADC reference voltage Vref versus image signal voltage $V_S$, assuming a pixel saturation level of 700 mV, a 6-bit ADC, and a delta δ of 1 dB. Reference voltage Vref need not follow every point on curve 400 to achieve the desired signal-to-noise ratio. Curve 400 simply sets an upper limit for Vref to achieve or surpass the target SNR.

In accordance with an embodiment, different ADC Vref levels can be selected depending on the image signal level $V_S$. For example, when $V_S$ is between 330 mV and 700 mV, the ADC reference voltage may be set to nominal Vref voltage level Vrefx. When $V_S$ falls between 85 mV and 330 mV, the ADC reference voltage may be switched to a lower reference voltage level Vrefx/2. When $V_S$ falls between 20 mV and 85 mV, the ADC reference voltage may be switched to an even lower reference voltage level Vrefx/4. As shown in the example of FIG. 4, each successive Vref switching points are selected as being powers of two.

From the digital processing point of view, Vref switching is equivalent to a voltage range shift, which can be easily implemented. As another example, only five different Vref values are needed for a 6-bit A/D converter to cover an effective 10-bit range (e.g., a lower resolution ADC can be used to cover a greater effective total resolution using floating point representation). This numerical representation scheme lends well to a floating point representation. To support floating point numbers, the ADC output may be the mantissa for a floating point number, whereas the Vref level may be the exponent for the floating point number (e.g., the sensor may adjust Vref level based on the illumination level). This type of floating point representation might be especially useful for high dynamic range (HDR) imaging.

Figure 5:
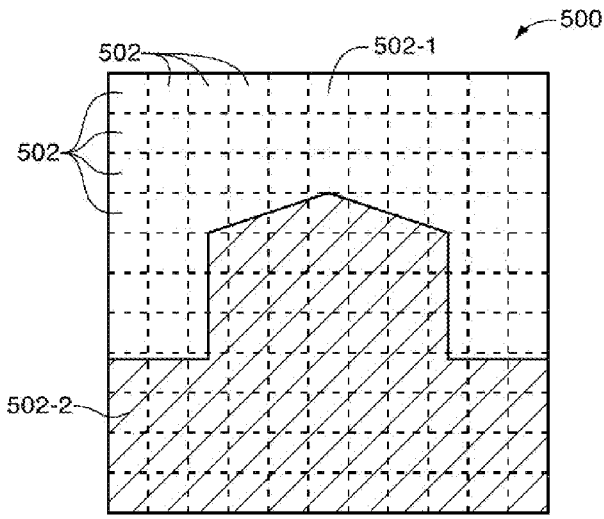
FIG. 5 is a diagram show how an image pixel array may be organized into "tiles" in accordance with an embodiment of the present invention.

The adjustment of Vref level may be performed while measuring the illumination level for a scene, which can be done in parallel with an auto exposure process. To further improve intra-scene dynamic range, it may also be desirable to divide an image into separate tiles as shown in FIG. 5. This approach is feasible since illumination generally exhibits low spatial frequency.

As shown in FIG. 5, an image pixel array 500 that is used to acquire an image may be divided into an array of tiles 502. Each tile 502 in the array may include an X number of pixels in the horizontal direction and a Y number of pixels in the vertical direction. To provide enhanced intra-scene dynamic range, each tile should have its own Vref level, which can be determined during an initialization process (e.g., during an auto exposure process) and optionally updated periodically/aperiodically. In the example of FIG. 5, a tile 502-1 corresponding to a brighter part of the image may be assigned a high Vref level, whereas a tile 502-2 corresponding to a darker part of the image may be assigned a relatively lower Vref level. If desired, the number and size of tiles 502 can be fixed or adapted to each scene by image processor 16 (FIGS. 1 and 2).

Figure 6:
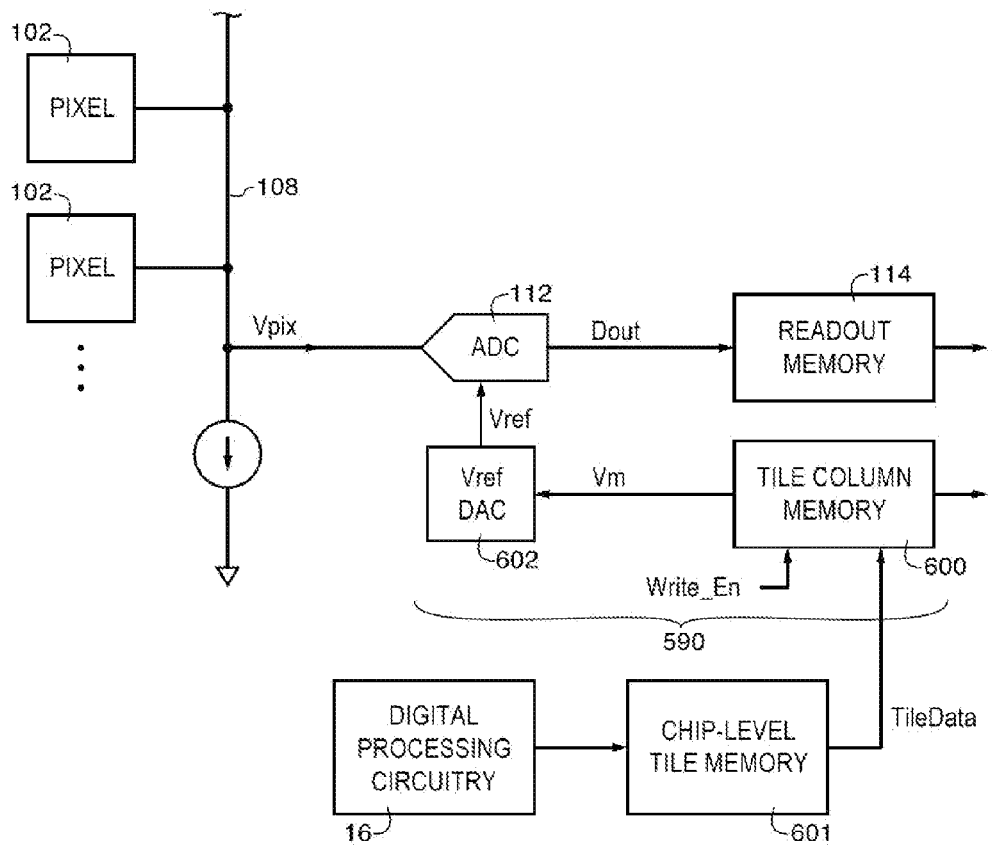
FIG. 6 is a diagram of illustrative column readout circuitry that includes tile column memory in accordance with an embodiment of the present invention.

FIG. 6 shows one suitable arrangement of column readout circuitry 590 that supports the floating point representation as described above. Multiple image sensor pixels 102 may be coupled to a common column output line 108. One of the multiple image sensor pixels 102 in that column may be selected for readout. The selected image sensor pixel 102 may output a corresponding pixel signal Vpix to the column readout circuitry 590.

As shown in FIG. 6, column readout circuitry 590 may include an ADC 112, a reference voltage digital-to-analog converter (DAC) 602, a readout memory circuit 114, and a tile column memory circuit 600. ADC 112 may have an input that receives Vpix from column line 108 and an output on which a digital output signal Dout is generated. During readout, signal Dout may be latched using readout memory 114. During initialization operations (e.g., in parallel with auto exposure operations), one frame data is read out while maximum Vref is supplied to ADC 112. Frame data that is read out during initialization may be analyzed in digital processing circuitry 16. Digital block 16 may then calculate all tile parameters and store the tile parameters in a global chip-level tile memory such as chip-level tile memory circuit 601. In general, chip-level tile memory 601 should not exceed the number of tiles multiplied by 3-bit depth in the case of a 12-bit ADC.

During actual readout, chip-level tile memory circuit 601 may preload some of the tile parameters (indicated as "TileData") into tile column memory circuit 600. TileData may be written into memory 600 whenever control signal Write_En is asserted. These tile parameters serve as exponent information and may be used to set the reference voltage level Vref for ADC 112 during mantissa conversion. As shown in FIG. 6, tile column memory 600 may output a mantissa control signal Vm that directs DAC 602 to output a desired Vref level. A Vref signal generated at the output of DAC 602 in this way may be controlled locally (i.e., using tile column memory 600) and shared between n columns, depending on the tile size (e.g., every n rows of the same tile should use the same exponent value). Circuitry 590 may be replicated for each tile column or for each pixel column in the image pixel array. Tile column memory 600 may be shared among a number of columns.

Figure 7:
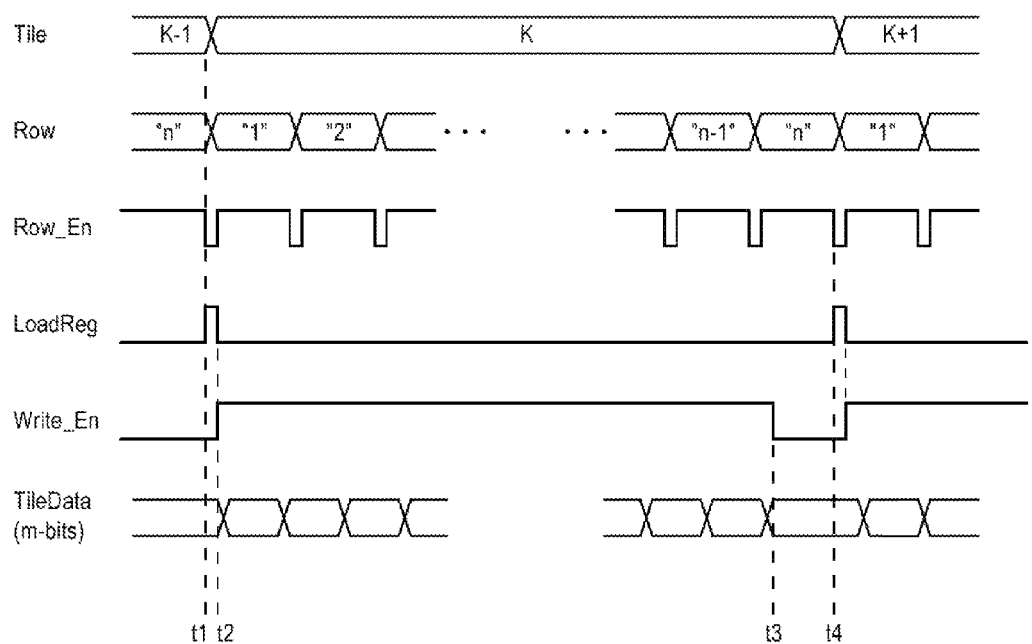
FIG. 7 is a timing diagram showing how tile data may be loaded into the tile column memory in accordance with an embodiment of the present invention.

FIG. 7 is a timing diagram that illustrates how tile column memory 600 can be operated. At the beginning of each tile (at time t1), the data may be loaded from the tile column memory 600 into a corresponding control register (e.g., by pulsing high a load register control signal LoadReg). Loading the control register with the tile data configures DAC 602 to provide appropriate Vref levels for that tile. During each tile period (e.g., from time t2-t3), the tile column memory 600 may latch data for the next tile through a serial interface by asserting write enable signal Write_En to sequentially write bits from the chip-level memory 601 to the tile column memory 600. As shown in FIG. 7, each tile may have n rows, which do not necessarily correspond to the actual row index in the array. At time t4, the tile data acquired during period t2-t3 may then be loaded from the tile column memory 600 into a corresponding control register by asserting LoadReg (e.g., to configure another DAC 602 to provide appropriate Vref levels for the next tile). In this example, the buffer tile column memory circuit 600 is only be configured to store parameters for the current and the next tile. This is merely illustrative.

DAC 602 configured using tile data loaded from tile column memory 600 in this way may provide an adjustable Vref level that is used by ADC 112 during mantissa conversion. The Vref level that is used during mantissa conversion may be power of 2 decrements based on the tile data (e.g., DAC 602 may set Vref to Vrefx, Vrefx/2, Vrefx/4, Vrefx/8, and so on). The tile data that is stored within tile column memory 600 may therefore serve as virtual "exponent" values in the floating point representation.

Figure 8:
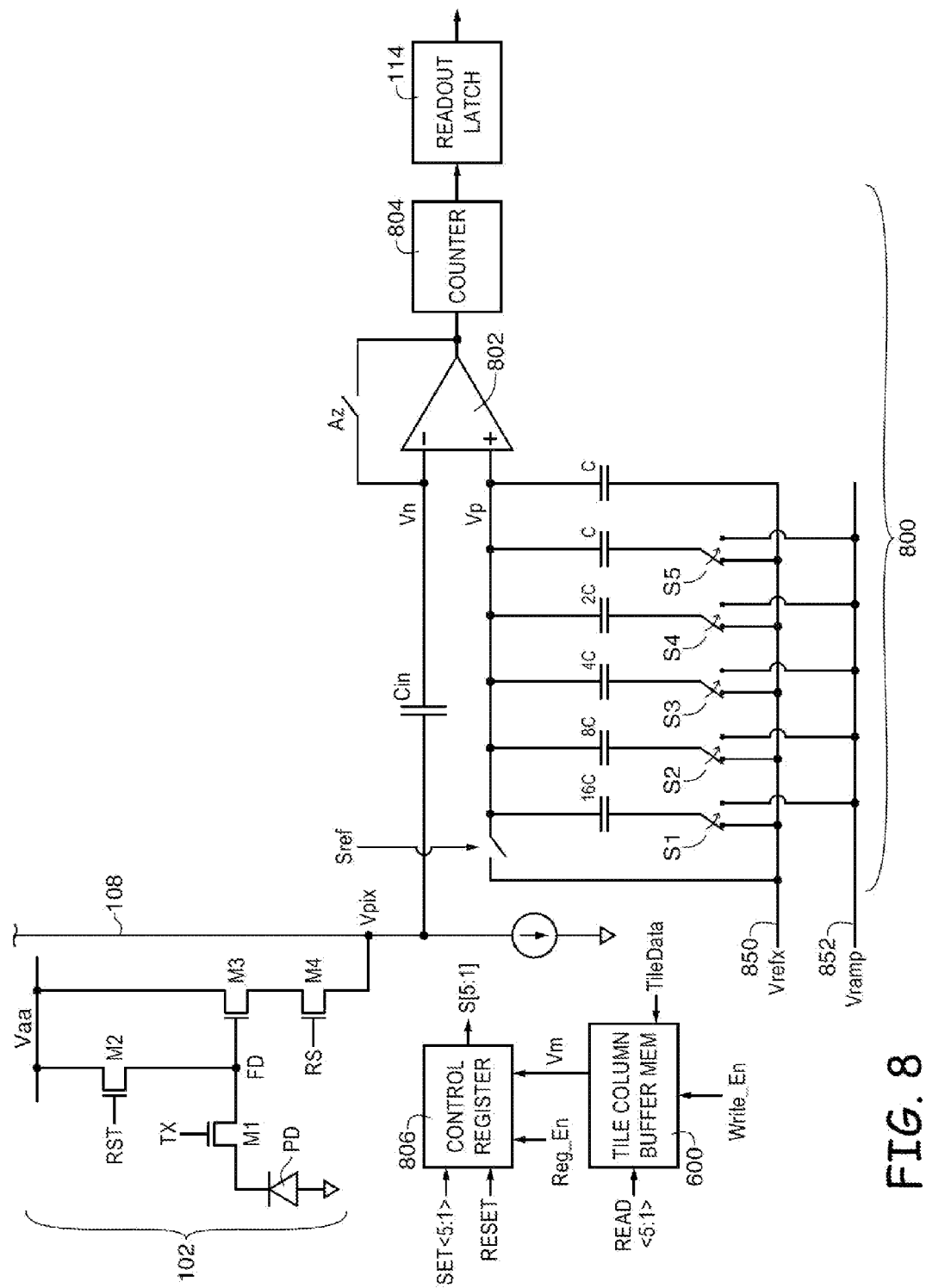
FIG. 8 is a circuit diagram showing one suitable implementation of the column readout circuitry of FIG. 6 in accordance with an embodiment of the present invention.

FIG. 8 shows a circuit diagram of exemplary single slope ramp ADC readout circuitry of the type described in connection with FIGS. 6 and 7. As shown in FIG. 8, pixel 102 may include a photodiode PD that is coupled to floating diffusion region FD by charge transfer gate M1 (e.g., a transistor pass gate) that is controlled by signal TX. Floating diffusion region FD may be coupled to pixel supply voltage Vaa by reset transistor M2 that is controlled by reset signal RST. Floating diffusion region FD may be coupled to pixel column path 108 via transistor M3 that forms a source-follower amplifier and row select transistor M4 controlled by row select control signal RS. Pixel output column path 108 may serve as a pixel output node shared by the pixels of a column of the array.

During pixel readout operations, a pixel output signal Vpix from a selected pixel 102 may be provided to ADC circuitry 800. As shown in FIG. 8, ADC circuitry 800 may include a comparator circuit such as comparator 802 having a first (positive) input, a second (negative) input, and an output, a signal sampling/coupling capacitor Cin that is coupled between column output line 108 and the negative input of comparator 802, and an auto-zeroing switch that is controlled be signal AZ and that is coupled between the negative input and the output of comparator 702. The signal at the negative (−) input of comparator 702 may be referred to herein as Vn, whereas the signal at the positive (+) input of comparator 702 may be referred to herein as Vp.

A/D converter circuitry 800 may also include a counter such as counter 804 that receives a digital signal from the output of comparator 802 and outputs that are coupled to readout latch 114 and tile column memory circuit 600 (sometimes referred to as tile column buffer memory). Memory 600 may also receive control signals READ<5:1> and write enable signal Write_En.

Converter circuitry 800 may also include a capacitive Vref DAC circuit (see, e.g., Vref DAC 602 of FIG. 6) having a 5-bit binary weighted capacitor array. The capacitive Vref DAC circuit may have a terminal that is coupled to the positive input of comparator 802. In particular, each of the binary weighted capacitors (e.g., capacitors 16C, 8C, 4C, 2C, and C) may have one end that is coupled to the positive input of comparator 802 and another end that is switchably coupled to a selected one of a Vref voltage supply terminal 850 and a ramp voltage supply terminal 852 via respective switches that are controlled by signals S1, S2, S3, S4, and S5. Vref supply terminal 850 may also be selectively coupled to the positive input terminal of comparator 802 via a switch that is controlled by signal Sref.

The ramp step can be controlled locally by the capacitive DAC, and the voltage at the positive input of comparator 802 can be expressed as:

$$V_p = V_{ref} - V_{ramp}\left(\frac{n}{32}\right) \quad (9)$$

where n is equal to 16 for the MSB ramp. The ramp signal Vramp may be coupled to only one of the binary weighted capacitors in the array during mantissa conversion. The ramp signal may have 63 steps, which corresponds to 6 bits of accuracy.

Control signals S1-S5 may be provided by a control register 806. Control register 806 may receive a mantissa control signal Vm from memory 600, a register enable signal Reg_En, a reset signal RESET, and set signals SET<5:1> and may output the control signals S<5:1> (i.e., control signals S1, S2, S3, S4, and S5). A selected one of control signals S<5:1> may be asserted during mantissa conversion depending on when Vm is asserted relative to set signals SET<5:1>.

Figure 9:
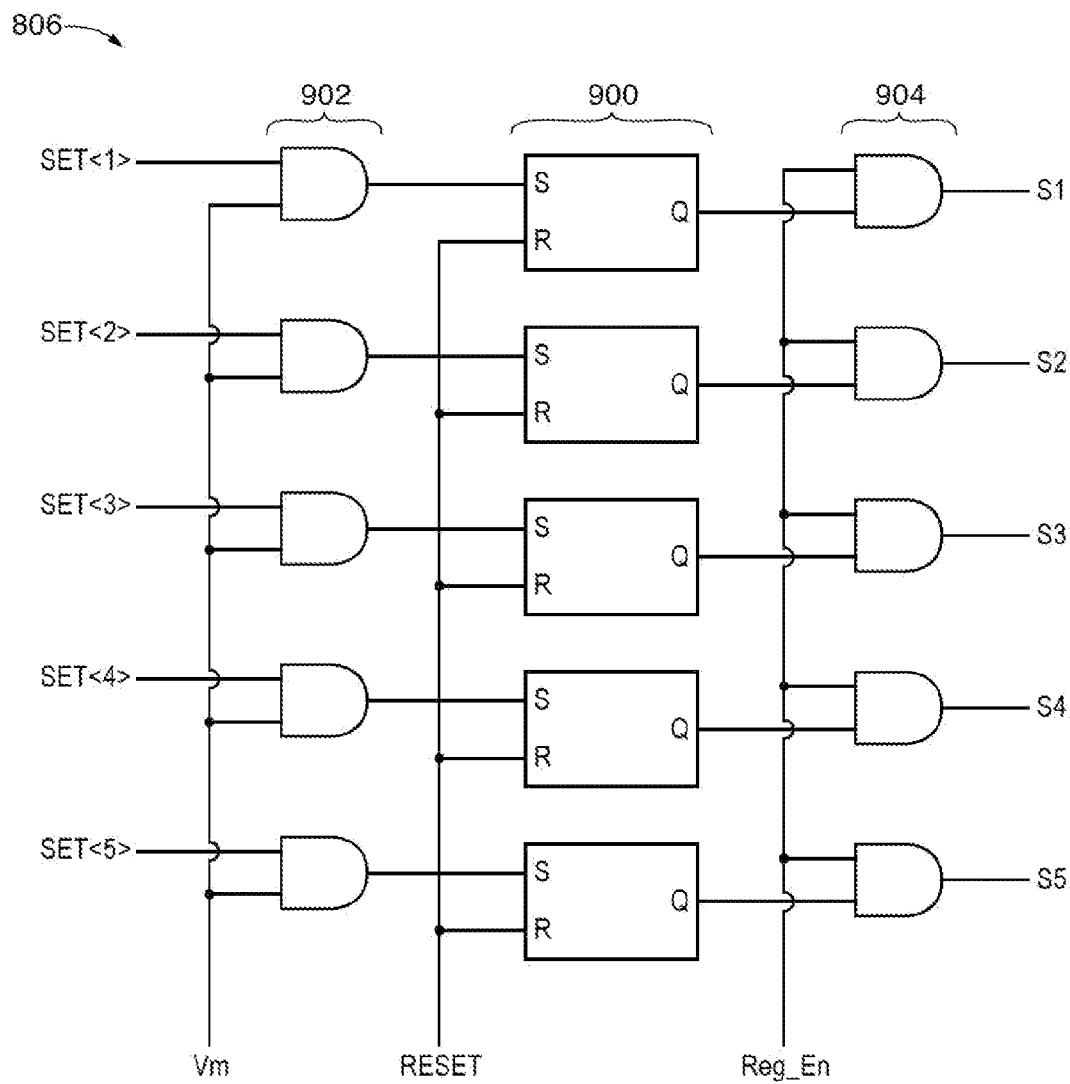
FIG. 9 is a circuit diagram of an illustrative control register in accordance with an embodiment of the present invention.

FIG. 9 shows a circuit diagram of control register 806. As shown in FIG. 9, register 806 may include a first group of logic AND gates each of which has a first input that receives signal Vm from tile column buffer memory 600, a second input that receives a respective one of signals SET<1>, SET<2>, SET<3>, SET<4>, and SET<5>, and an output that is coupled to the "set" (S) input of a corresponding set-reset (RS) latch 900. Configured in this way, the set signals can only be passed to the RS latches 900 when Vm is asserted. Each latch 900 may also have a "reset" (R) that receives register reset signal RESET and an output (Q) terminal that is coupled to a first input of a corresponding logic AND gate 904. Each gate 904 may also have a second input that receives register enable signal Reg_En and an output on which one of signals S1-S5 is provided. Configured in this way, only one of latches 900 should provide a high data output to assert one of signals S<5:1> when Reg_En is asserted. The arrangement of FIG. 9 is merely illustrative. Other ways for implementing control register 806 may be used, if desired.

Figure 10:
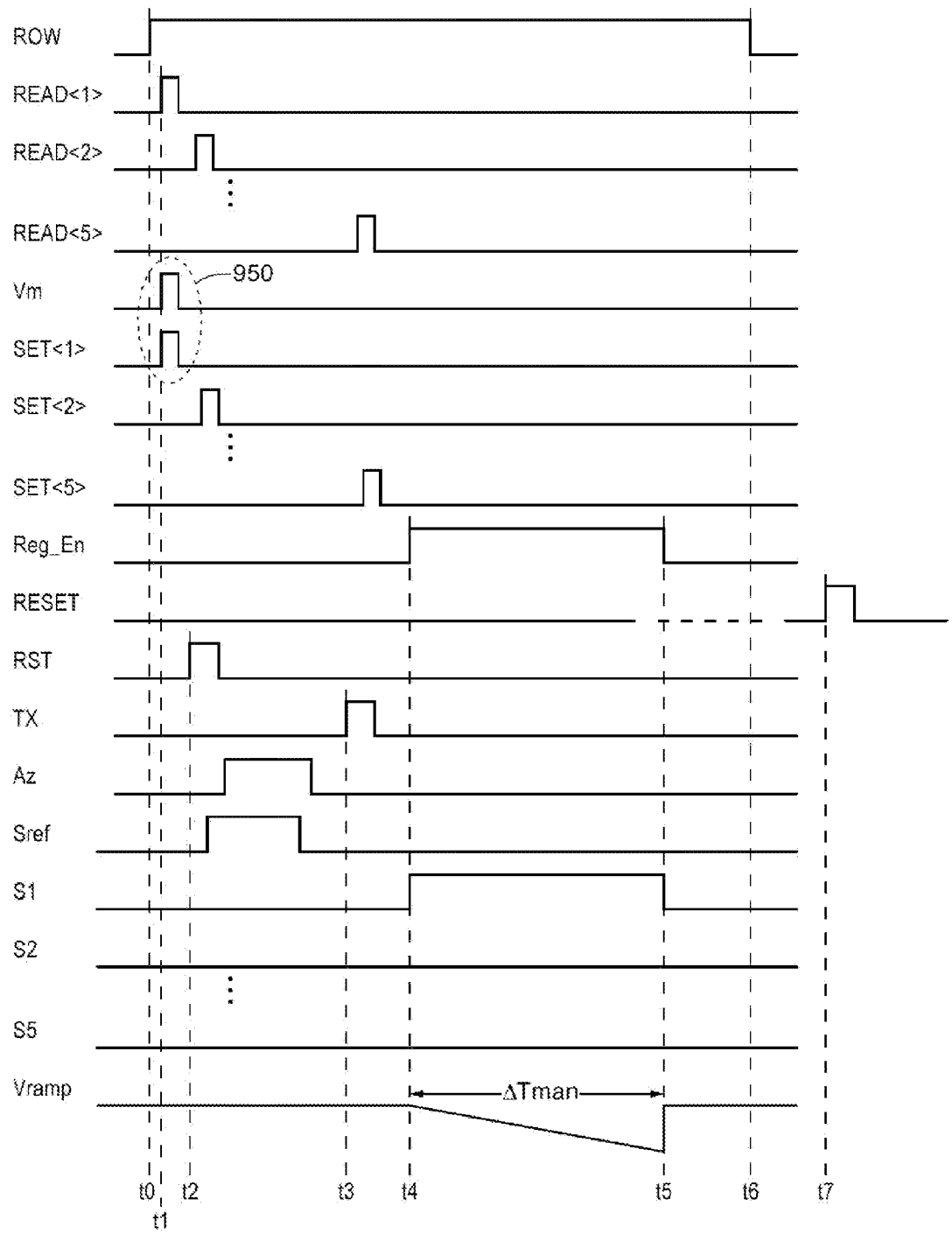
FIG. 10 is a timing diagram illustrating the operation of column readout circuitry of the type shown in FIG. 8 in accordance with an embodiment of the present invention.

FIG. 10 is a timing diagram that illustrates the operation of the column readout circuitry of FIG. 8. At time t0, one of the row select signals RS may be asserted so that a pixel output signal Vpix is provided on the column output line. Starting at time t1, tile column memory read enable signals READ<5:1> may be sequentially asserted to read tile data Vm out from tile column buffer memory 600 (see, FIG. 8). In general, tile column buffer memory 600 may be shared among pixel columns that belong to the same tile. Signal SET<5:1> may also be sequentially asserted starting at time t1. One of signals SET<5:1> may be loaded into the control register 806 based on signal Vm. In the example of FIG. 1, an asserted Vm is read out during assertion of SET<1> (see, portion 950 in FIG. 10), and as a result, signal S1 may be asserted later on during mantissa conversion.

At time t2, the selected image pixel may be reset by asserting signal RST. Thereafter, signal Sref may be asserted to charge Vp to nominal reference voltage level Vrefx (e.g., by shorting the Vref supply terminal 850 to the positive input of comparator 802). Doing so also connects the top plates of the array of capacitors to the Vref supply terminal. Optionally, signal AZ may also be temporarily asserted to perform auto-zeroing operations on comparator 802.

At time t3, the accumulated charge in the selected image pixel may be transferred to the floating diffusion node for readout by asserting signal TX. This signal charge transfer may generally pull Vpix and Vn downwards.

From time t4 to t5, register enable signal Reg_En may be asserted to selectively assert one of signals S<5:1>. In this example, signal S1 may be asserted to connect the bottom plate of the MSB capacitor (16C) to the ramp voltage Vramp. While Vramp is being ramped down, comparator 804 will flip at some point and counter 804 will latch a corresponding mantissa value, which may be stored in readout lath 114. A mantissa value obtained in this way can then be combined with the exponent value that is stored in the tile column memory 600 (i.e., the exponent value that was previously obtained during an auto exposure period for that tile before the image was taken) to yield a final floating point number for that image pixel.

In the example of FIG. 10, only signal S1 is asserted to switch capacitor 16C into use, giving Vramp a step size that corresponds to a Vref level that is equal to Vrefx/2 during the mantissa conversion period. As another example, asserting only signal S2 will switch capacitor 8C into use, giving Vramp a step size that corresponds to an adjusted Vref level of Vrefx/4 during mantissa conversion. As yet another example, asserting only signal S3 will switch capacitor 4C into use, giving Vramp a step size that corresponds to an adjusted Vref level of Vrefx/8 during mantissa conversion.

At the end of readout, the register reset control signal RESET may be asserted to short the bottom plates of all DAC capacitors back to Vref (e.g., by shorting the bottom plates of all the capacitors in the DAC array to the Vref supply terminal 850).

The example of FIG. 8 in which floating point ADC circuitry 800 is implemented using a single slope ramp ADC is merely illustrative and does not serve to limit the scope of the present invention. If desired, ADC circuitry 800 may be implemented using other types of A/D converting circuits such as multi-slope ramp ADCs, successive approximation register ("SAR") ADCs, flash ADCs, Wilkinson ADCs, pipeline ADCs, sigma-delta ADCs, time-interleaved ADCs, a hybrid of these different types of ADCS, and/or other suitable types of ADCs. In general, SAR ADCs are faster than ramp ADCs but consume relatively more power. As a result, a hybrid SAR-ramp ADC may be implemented that exhibits improved performance and reduced power consumption.

Figure 11:
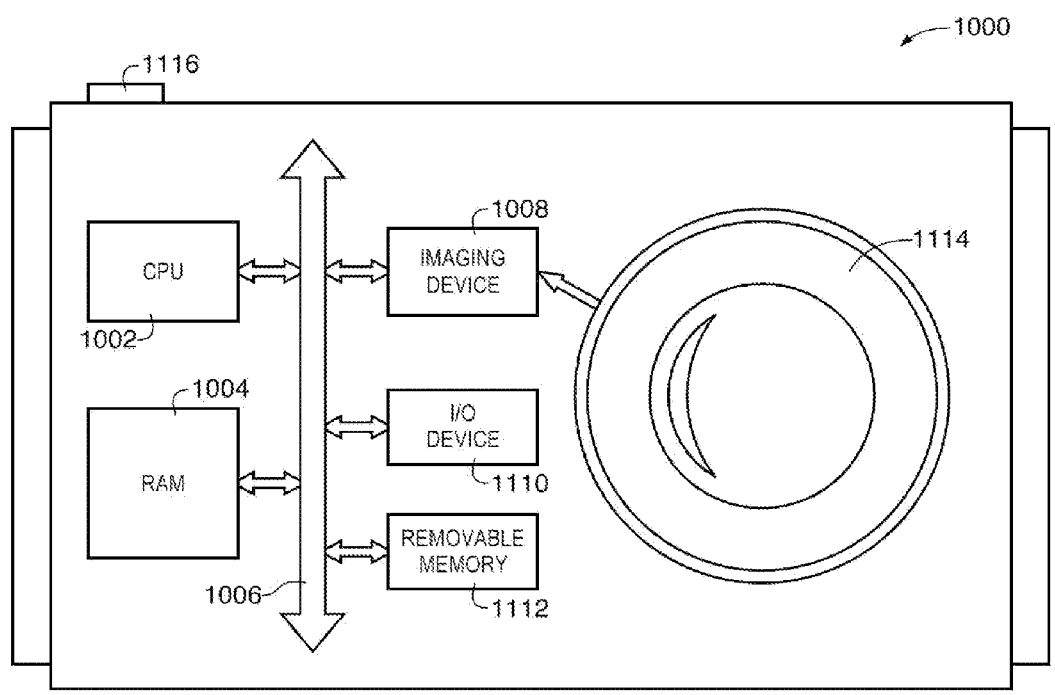
FIG. 11 is a block diagram of a system employing the embodiments of FIGS. 5-10 in accordance with an embodiment of the present invention.

FIG. 11 is a simplified diagram of an illustrative processor system 1000, such as a digital camera, which includes an imaging device 1008 (e.g., the camera module of FIG. 1) employing an imager having pixels with improved pixel readout and analog-to-digital conversion capabilities as described above. Without being limiting, such a system could include a computer system, still or video camera system, scanner, machine vision system, vehicle navigation system, video phone, surveillance system, auto focus system, star tracker system, motion detection system, image stabilization system, and other systems employing an imaging device.

Processor system 1000, for example a digital still or video camera system, generally includes a lens 1114 for focusing an image onto one or more pixel array in imaging device 1008 when a shutter release button 1116 is pressed and a central processing unit (CPU) 1002 such as a microprocessor which controls camera and one or more image flow functions. Processing unit 1102 can communicate with one or more input-output (I/O) devices 1110 over a system bus 1006. Imaging device 1008 may also communicate with CPU 1002 over bus 1006. System 1000 may also include random access memory (RAM) 1004 and can optionally include removable memory 1112, such as flash memory, which can also communicate with CPU 1002 over the bus 1006. Imaging device 1008 may be combined with the CPU, with or without memory storage on a single integrated circuit or on a different chip. Although bus 1006 is illustrated as a single bus, it may be one or more busses, bridges or other communication paths used to interconnect system components of system 1000.

Various embodiments have been described illustrating imagers with pixels having improved pixel readout and analog-to-digital conversion capabilities.

An imager may include an array of image sensor pixels arranged in rows and columns. The array of image pixels may be organized into tiles each of which includes multiple rows and columns of image sensor pixels. Each image pixel along a column may be coupled to a column output line. One of the image pixels along the column may be selected for readout. The selected image sensor pixel may output an analog pixel signal onto the column output line.

The imager may also include column readout circuitry for converting the analog pixel signal into a corresponding floating point number. Readout circuits associated with different columns that are part of the same tile may be coupled to a shared tile column memory circuit. Each readout circuit may include an analog-to-digital converter (ADC) and a digital-to-analog converter (DAC) that supplies an adjustable reference voltage to the ADC. The reference voltage may be adjusted based on bits stored in the tile column memory. The bits in the tile column memory may be obtained during an auto exposure operation prior to actual readout.

Generally, the bits stored in the tile column memory may represent exponent information, whereas the ADC generates corresponding mantissa information during readout. The exponent information can be combined with the mantissa information to yield a floating point number.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. An image sensor, comprising:
    an array of image sensor pixels arranged in rows and columns, wherein the array has a total number of rows of image sensor pixels, wherein the array is grouped into tiles each of which includes multiple rows and columns of image sensor pixels, and wherein each tile includes a number of rows of image sensor pixels that is less than the total number of rows of image sensor pixels;
    a first column output line that is coupled to a first column of image sensor pixels in a given tile;
    a second column output line that is coupled to a second column of image sensor pixels in the given tile;
    first readout circuitry that is coupled to the first column output line;
    second readout circuitry that is coupled to the second column output line; and
    a tile column memory circuit that is shared between the first and second readout circuitries, wherein the first readout circuitry and the second readout circuitry receive pixel signals from the image sensor pixels, wherein the first readout circuitry and the second readout circuitry convert the received pixel signals into floating point numbers, wherein the first readout circuitry and the second readout circuitry generate mantissa information from the received pixel signals, wherein the tile column memory circuit stores exponent information, and wherein the exponent information is combined with the mantissa information to obtain the floating point numbers.

2. The image sensor defined in claim 1, wherein the first readout circuitry includes a first analog-to-digital converter (ADC), and wherein the second readout circuitry includes a second analog-to-digital converter (ADC).

3. The image sensor defined in claim 2, wherein the first readout circuitry further includes a first digital-to-analog converter (DAC), and wherein the second readout circuitry further includes a second digital-to-analog converter (DAC).

4. The image sensor defined in claim 3, wherein the first and second DACs supply reference voltages having a voltage level that is adjusted based on data stored in the tile column memory circuit.

5. The image sensor defined in claim 3, wherein the first DAC comprises an array of binary weighted capacitors, and wherein each capacitor in the array of binary weighted capacitors is selectively switched into use using respective switches.

6. The image sensor defined in claim 5, further comprising:
a control register that receives input signals from the tile column memory circuit and that generates control signals for selectively activating the respective switches.

7. The image sensor defined in claim 6, wherein the control register comprises:
a digital latch having an input and an output;
a first logic gate that is coupled to the input of the digital latch; and
a second logic gate that is coupled to the output of the digital latch.

8. The image sensor defined in claim 7, wherein the digital latch comprises a set-reset latch.

9. The image sensor defined in claim 7, wherein the first and second logic gates comprises logic AND gates.

10. The image sensor defined in claim 1, wherein the first readout circuitry receives analog pixel signals from the array of image sensor pixels and converts the analog pixel signals into floating point numbers.

11. The image sensor defined in claim 1, wherein the array has a total number of columns of image sensor pixels, and wherein each tile includes a number of columns of image sensor pixels that is less than the total number of columns of image sensor pixels.

12. An image sensor, comprising:
an array of image sensor pixels arranged in rows and columns, wherein the array is grouped into tiles each of which includes multiple rows and columns of image sensor pixels;
a first column output line that is coupled to a first column of image sensor pixels in a given tile;
a second column output line that is coupled to a second column of image sensor pixels in the given tile;
first readout circuitry that is coupled to the first column output line and receives first pixel signals from the first column output line, wherein the first readout circuitry generates first mantissa information from the received first pixel signals;
second readout circuitry that is coupled to the second column output line and receives second pixel signals from the second column output line, wherein the second readout circuitry generates second mantissa information from the received second pixel signals; and
a tile column memory circuit that is shared between the first and second readout circuitries, wherein the tile column memory circuit stores exponent information, wherein the exponent information is combined with the first mantissa information to obtain first floating point numbers by the first readout circuitry, and wherein the exponent information is combined with the second mantissa information to obtain second floating point numbers by the second readout circuitry.

* * * * *